(12) United States Patent
Haswarey et al.

(10) Patent No.: US 7,100,038 B2
(45) Date of Patent: Aug. 29, 2006

(54) SYSTEM AND METHOD FOR DEVICE PARAMETER PERSISTENCE

(75) Inventors: Asif H. Haswarey, Newark, CA (US); Francesco R. DiMambro, San Jose, CA (US); Anil Umarshi Visariya, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 501 days.

(21) Appl. No.: 10/388,571

(22) Filed: Mar. 13, 2003

(65) Prior Publication Data

US 2004/0181658 A1    Sep. 16, 2004

(51) Int. Cl.
*G06F 9/445* (2006.01)
*G06F 15/177* (2006.01)

(52) U.S. Cl. .............................. 713/2; 713/1
(58) Field of Classification Search .................... 713/1, 713/2
See application file for complete search history.

(56) References Cited

U.S. PATENT DOCUMENTS

| | | | |
|---|---|---|---|
| 5,280,627 A | | 1/1994 | Flaherty |
| 5,339,432 A | * | 8/1994 | Crick ............................ 713/1 |
| 6,263,378 B1 | | 7/2001 | Rudoff |
| 6,567,860 B1 | * | 5/2003 | Maxwell et al. ............ 719/327 |
| 6,931,646 B1 | * | 8/2005 | Dubal ......................... 719/327 |
| 2002/0083226 A1 | | 6/2002 | Awasthi |
| 2003/0028628 A1 | * | 2/2003 | Irwin et al. ................. 709/222 |
| 2003/0115339 A1 | * | 6/2003 | Hodoshima ................. 709/228 |
| 2003/0120820 A1 | * | 6/2003 | Chen .......................... 709/250 |

FOREIGN PATENT DOCUMENTS

EP    0396097 A2    7/1990

OTHER PUBLICATIONS http://techrepublic.com.com/5254-6257-0.html?forumID=99&threadID=173898&messageID=1783490&id=3923716 , Understanding OSes: Booting, Jun. 4, 2005.*
Adams, David "ifconfig - configure network interface parameters" 1995, XP002154499.
"IEEE Standard for Boot (Initialization Configuration) Firmware: Core Requirements and Practises" 1994 IEEE Computer Society, New York, USA, XP002363711, URL:www.ieee.org.
European Search Report Issued by the European Patent Office for EP04251168.3, which corresponds to U.S. application No. 10/388,571.

* cited by examiner

*Primary Examiner*—Chun Cao
*Assistant Examiner*—Mark Connolly
(74) *Attorney, Agent, or Firm*—Park, Vaughan & Fleming LLP

(57) ABSTRACT

A system and method for persisting device operating parameters through different phases of the boot process of a computer system. A boot command is entered to boot from a remote (or local) source through a boot device (e.g., a network interface, a disk controller), and is accompanied by one or more operating parameters (e.g., speed, duplex, link-clock). The parameters are converted to properties of the boot device and saved. Subsequently, one or more communication connections are established using the boot device properties. Using an initial boot program, the system may establish a first connection to access and load a secondary boot program, and another connection to load an operating system kernel. The boot device properties are thus used to establish communication connections at different times in the boot process, while the system is controlled by different programs (e.g., open boot PROM, secondary boot program, operating system kernel).

30 Claims, 3 Drawing Sheets

SYSTEM AND METHOD FOR DEVICE PARAMETER PERSISTENCE

BACKGROUND

This invention relates to the field of computer systems. More particularly, a system and methods are provided for enabling device operating parameters (e.g., speed or duplex settings) to persist across different phases of initialization of a computer system.

Many of today's computer systems pass through multiple phases during their initialization or booting process. In the first phase, a boot command is entered that directs the system to boot from a source that may be local (e.g., hard disk) or remote (e.g., network). System firmware (e.g., an Open Boot PROM (OBP)) may operate a suitable driver (e.g., an FCode driver) to initialize a device (e.g., disk controller, network interface card) capable of establishing a communication link with the source. Using the device, the firmware locates and loads a secondary boot program.

In the second phase of the boot process, the secondary boot program locates and loads the operating system kernel. The source of the secondary boot program may or may not be the same source from which the kernel is loaded. In a third phase of the boot process, the system kernel loads the operating system and makes the computer system ready for use.

Because control or operation of the computer system and/or individual components of the system may pass among multiple entities (e.g., OBP, FCode driver, operating system kernel), the system device through which a connection is established to boot the system may have to be initialized, or a communication connection through the component may have to be established, multiple times.

Furthermore, some devices need to operate, or operate most effectively, in particular modes or with particular settings. For example, a communication link controlled by a network interface card (NIC) may be configured for operation in either auto-negotiation mode or forced mode. In auto-negotiation mode, the interface may attempt to detect (e.g., via link auto-negotiation or parallel detection) the settings of its link partner (e.g., a switch, router) regarding speed, duplex (e.g., half or full), link-clock for speeds greater than 1 Gbps (e.g., master, slave), etc. If the interface cannot correctly determine the link partner's settings, the link may not be usable. In non-auto-negotiated mode (or forced mode), the interface must be configured with link capability settings that are compatible with the link partner.

Unfortunately, there currently is no mechanism for guaranteeing the persistence of a device's operating parameters (e.g., speed, duplex setting) through all three phases of the initialization of a computer system in a consistent manner. This may cause the device to become unusable, or require initialization to be restarted, if an incorrect parameter setting is applied. Or the boot process may become inefficient (e.g., slow) because of work-around solutions to the need to determine or apply an operating parameter. Conversely, if the desired settings for the device could be established just once and then used in each phase of the booting process, the process may finish faster, and with less chance for error.

Therefore, it would be advantageous to determine a device's settings once and to have those settings persist through each phase of an initialization process.

SUMMARY

In one embodiment of the invention, a system and methods are provided for persisting device operating parameters through different phases of the boot process of a computer system. A boot command is entered to boot from a remote (or local) source through a boot device (e.g., a network interface), and is accompanied by one or more operating parameters (e.g., speed, duplex, link-clock). The parameters are converted to properties of the boot device and saved (e.g., in a device-specific information data structure).

Subsequently, one or more communication connections are established using the boot device properties. Using an initial boot program (e.g., OBP firmware), the system may establish a first connection to a boot source to access and load a secondary boot program (e.g., a program called inetboot for systems configured to operate the Solaris operating system). The computer system may then establish a later connection to a root source to load an operating system kernel.

The boot device properties are thus used to establish communication connections at different phases of the boot process, while the system is controlled by different programs (e.g., the initial boot program, an FCode driver, an operating system kernel).

DETAILED DESCRIPTION

Figure 1:
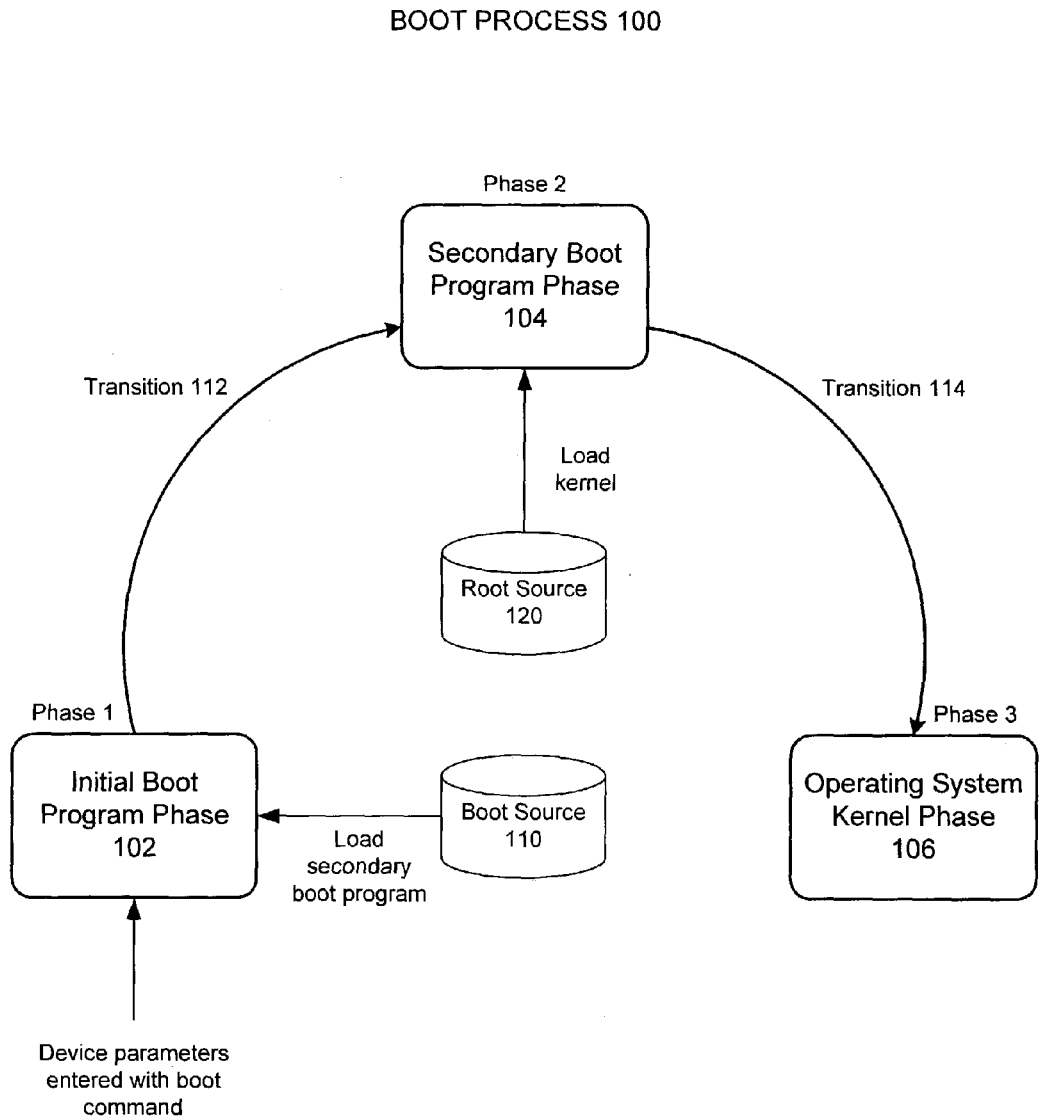
FIG. 1 is a block diagram of a multi-phase boot process for a computer system, in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

In one embodiment of the invention, a method is provided for facilitating the persistence of a computer system device's operating parameters throughout initialization or booting of the system.

In this embodiment, one or more parameters or settings are specified by the initiator of the boot process (or are contained in a script or other file used during booting). The parameter settings may comprise specific values (e.g., 1000 Mbps data rate, full duplex, master link-clocking), or may comprise requests for auto-negotiation with a link partner (e.g., a switch, a router, an input/output subsystem) to set one or more parameters.

The parameters are then converted into a form usable by the boot device—the device through which the system is booted (e.g., a disk controller, a network interface). For example, desired speed and duplex settings for a network interface, such as 100 Mbps and full duplex, respectively, may be converted into device properties expressed in the form understood by the boot device (e.g., IEEE Standard 802.3ab, clause 22.2).

The properties are retained for use throughout the booting process, to facilitate communication connections with the boot device's link partner (e.g., an input/output subsystem, a network host). Illustratively, the properties may be stored in a device-specific information data structure created during an initial booting phase. A communication connection may then be established or re-established through the boot device as necessary to proceed with the booting process. For example, an initial boot program (e.g., an Open Boot PROM or OBP) may use the boot device properties to establish a first connection to load a secondary boot program. When executed, the secondary boot program may establish a second connection to a source of an operating system kernel to be loaded.

As one skilled in the art will recognize, because boot device parameters have traditionally been non-persistent during the booting of a computer system, the system may have been unable to reliably establish one or more communication connections during booting. In particular, if the system is booting from a remote source (e.g., across a network), and the link partner is operating in forced mode (i.e., is configured to operate with a specific data rate, link-clock setting, etc.) while the computer system is configured to auto-negotiate, the system may be unable to determine the link partner's settings. If unable to determine the link partner's data rate or other setting, the system will be unable to establish a dependable communication connection with the link partner. The same problem may be encountered if the computer system is configured for forced mode operation and the link partner is configured for auto-negotiation.

Therefore, in an embodiment of the invention described herein, operating parameters of a boot device may be configured to persist through different phases of a boot process, to facilitate the establishment of reliable communication connections using predetermined (or auto-negotiated) parameter values.

FIG. 1 demonstrates a multi-phase boot process for a computer system, during which device parameters persist, according to one embodiment of the invention. In this embodiment, boot process 100 includes Initial Boot Program phase 102, Secondary Boot Program phase 104 and Operating System Kernel phase 106. Transitions 112, 114 represent transitions between the phases.

In initial boot program phase 102, an Open Boot PROM (OBP), or other initial boot program, may execute an FCode Device Driver to find and load the secondary boot program. In secondary boot program phase 104, the secondary boot program (e.g., a program called inetboot or ufsboot) is executed to locate and load an operating system kernel.

During normal operation of the computer system, a boot device (e.g., network interface) may be reinitialized or reset in each phase of the boot process. Thus, without persistent boot device operating parameters, an attempt to establish a communication connection through the boot device may fail. In one embodiment of the invention, the boot device may be a computer system component (e.g., a disk controller) configured to provide access to a disk drive or other local storage device.

Boot source 110 stores the secondary boot program. Root source 120 stores the operating system kernel (e.g., the kernel of the Solaris operating system by Sun Microsystems, Inc.) and/or an operating system to be loaded into the computer system during the boot process. In different embodiments of the invention, a boot source may be separate from, or colocated with a root source.

In this embodiment of the invention, the boot source is remote from the computer system (e.g., located on a network coupled to the system). In other embodiments it may be local (e.g., a local hard disk).

As shown in FIG. 1, one or more parameters for operating or controlling a device, especially the boot device through which the boot source is accessed, are entered during phase 1 (Initial Boot Program phase 102). Also during phase 1, a connection is established to the boot source and the secondary boot program is located and loaded.

During phase 2 (Secondary Boot Program phase 104), the secondary boot program (e.g., inetboot) is executed by the computer system's processor to locate and download the operating system kernel. An FCode driver on the boot device may be employed to retrieve the kernel.

During phase 3 (Operating System Kernel phase 106), the operating system kernel (or other tertiary boot program) is executed. One or more other code components or modules may also be loaded and executed (e.g., a driver for the boot device, a root file system).

Figure 2:
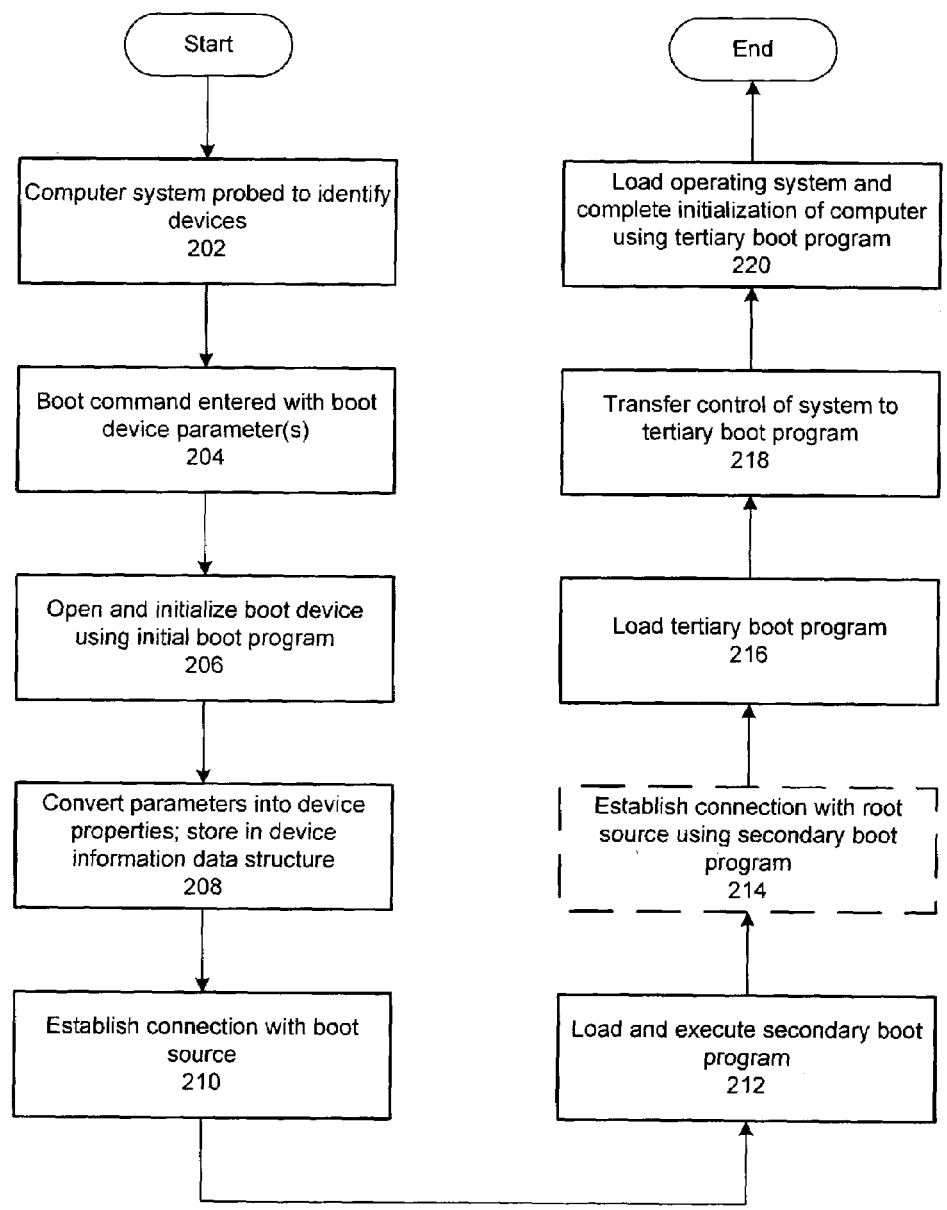
FIG. 2 is a flowchart illustrating one method of booting a computer system while operating parameters of a boot device persist throughout the boot process, in accordance with an embodiment of the invention.

FIG. 2 demonstrates a method of facilitating the persistence of operating parameters of a device through which a connection is established with a boot source, according to one embodiment of the invention. This method is configured for implementation with a multi-phase boot process such as boot process 100 of FIG. 1. In the illustrated method, a computer system is booted from a remote source (e.g., on a network), but the method may be modified to boot from a local source (e.g., a hard disk) without exceeding the scope of the invention.

In operation 202, a computer system is powered on, during which various diagnostic procedures may be performed. Also, the system is probed to locate and identify devices connected to the system (e.g., peripherals, communication interface cards, local storage devices).

Following the system probe, the system may assemble configuration and status information for the identified devices. In particular, for each device, a device information data structure is created and used by the device's device driver to store information and operate the device. After initial power-on and any self-test, the system may display an OBP prompt "OK>".

The system may assemble a device tree or other structure representing the devices identified during the probe. Illustratively, each node represents a separate device and may provide access to the device-specific information data structure.

In operation 204, a command to boot the system is entered by an operator or as part of an automatic initialization routine. Illustratively, the command identifies the source from which the system should boot. For example, the operator may enter the command "boot net" to boot from a remote (e.g., network) source, or "boot disk" to boot from a local hard disk.

Also, the command includes one or more link parameters or settings for the device (the "boot device") through which the system will access the boot source. In this embodiment, the boot device is a NIC, but in other embodiments may be an input/output controller or some other device through which a wired or wireless, dedicated or shared connection may be established with the boot source.

One or more of the parameters may indicate that they are to be, or may be, determined through an auto-negotiation process with a link partner (e.g., a switch, a router). Otherwise, the parameters comprise specific values applied to operate the device in forced mode. For the illustrated method, the parameters may include a data rate (e.g., 10 Mbps, 100 Mbps, 1000 Mbps, 10000 Mbps), a duplex setting (e.g., full or half), a link-clock setting (e.g., master, slave), etc.

Thus, a boot command "boot net" may include any or all of the following parameters, where "master" indicates whether the system should be the master for clocking purposes:

speed={10000|1000|100|10|auto}
duplex={full|half|auto}
link-clock={master |slave |auto}

As one skilled in the art will appreciate, at data rates below 1000 Mbps the clocking parameter may not be applicable, but the speed and duplex parameters may be set by the operator or may be auto-negotiated. At data rates of 1000 Mbps and above, any or all of the parameters may be set to specific values or auto-negotiated. Illustratively, a link-clock value of "master" indicates the boot device should be the link-clock master; a value of "slave" indicates it is to be the slave.

In operation 206, the boot device is opened and initialized (e.g., by the OBP or other initial boot program), by calling routines offered by a driver for the device. For example, an FCode driver may reside in an FCode PROM on the device.

In operation 208, after the boot device is opened, the (FCode) driver converts some or all of the boot parameters into device properties and stores them in the boot device's property information data structure. In particular, for each parameter setting specified in the boot command, the corresponding keyword or value described in the IEEE 802.3ab standard is generated and stored.

Thus, depending on the specified data rate and duplex setting for forced mode operation, one of the following keywords is set (to the value 1): 10000fdx, 10000hdx, 1000fdx, 1000hdx, 100fdx, 100hdx, 10fdx, 10hdx. If, however, auto-negotiate is indicated for the duplex, then both keywords for the indicated data rate will be set (e.g., 1000fdx and 1000hdx).

If auto-negotiate is signaled for the data rate, then multiple keywords will be set, depending on whether a particular duplex setting is specified or whether auto-negotiation is also requested for the duplex setting.

If the link-clock setting is "master" or "slave", then the boot device is to set the clock in forced mode, and the (G)MII Register Specification master-cfg-enable keyword is set (to the value 1). Depending on whether the link-clock setting is "master" or "slave", the master-cfg-value keyword is set (master) or cleared (slave), respectively. If the link-clock is set to "auto," then mastership of the clock will be auto-negotiated.

In operation 210, the boot device (e.g., via its FCode driver) establishes a connection to a boot source, using the properties created and stored in operation 208. For example, if any of the parameters were expressed as "auto," the device will attempt to auto-negotiate their settings with its link partner. For any specific value, the boot device will implement those values while attempting to establish the connection.

In operation 212, a secondary boot program is loaded from the boot source. For example, in a computer system configured to boot remotely and execute the Solaris operating system, the secondary boot program is called inetboot. "inetboot" is loaded and executed, and takes over control of the computer system and the boot process. Illustratively, the inetboot program enables the system to locate a root source—a source of the operating system kernel—particularly if different from the boot source.

In optional operation 214, using the secondary boot program, the device establishes a communication connection with the source of the operating system kernel to be loaded. The same properties used to establish the connection in operation 210 may be retrieved from the device's property information data structure and used to create the connection.

In operation 216, a tertiary boot program (e.g., an operating system kernel) is loaded. Other executable code (e.g., modules, routines, functions) may be loaded or copied at the same time. The other code may include a device driver for the boot device (e.g., to use in place of the FCode driver), a root file system, a protocol stack, and so on.

In operation 218, the initial boot program invokes and passes control of the computer system to the tertiary boot program. In this embodiment, the tertiary boot program copies the device property information data structures that were assembled earlier (e.g., by the FCode driver for the boot source). The tertiary boot program may also reinitialize some or all of the system devices.

In operation 220, the system finishes loading an operating system and initializing the boot device and the rest of the computer system. Because values for the boot device's operating parameters were previously stored as device properties, they are available for configuring the device under the operating system.

In particular, the operating system does not need to determine or select the parameter settings and then convert them into (for Ethernet) GMII parameters, because the device properties were saved as GMII parameters that can be loaded into the boot device's registers. Thus, it is more likely that the system will be able to establish a reliable connection with the boot device's link partner.

In the method of FIG. 2, boot device operating parameters were converted to hardware operating settings early in the boot process, and saved as device parameters in the computer system's device tree. As one result, debugging the boot device's operation is made easier because its hardware settings are readily available for review.

Figure 3:
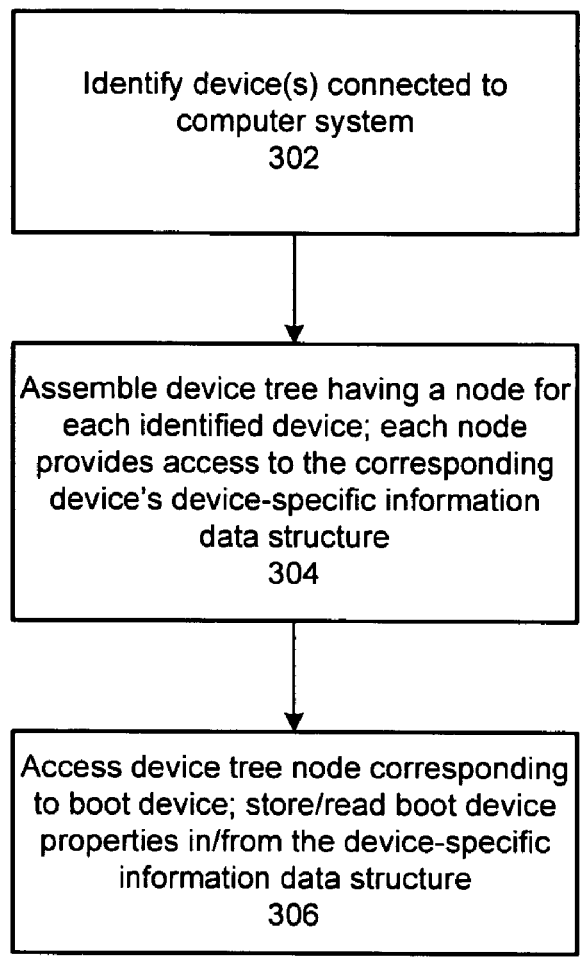

FIG. 3 illustrates the use of a device tree for providing access to device-specific information data structures in the embodiment of the invention shown in FIG. 2. In operation 302, one or more devices connected to the computer system are identified (e.g., through probing in operation 202 of FIG. 2). In operation 304, a device tree is assembled with a node representing or corresponding to each identified device. Each device's node provides access to the device's device-specific data structure. In operation 306, a node of the device tree corresponding to the boot device is accessed. Through that node, a property of the boot device may be stored in or read from the boot device's device-specific information data structure (e.g., as in operation 208 or 220 of FIG. 2).

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A method of persisting boot device operating parameters, comprising:
   receiving one or more operating parameters for a boot device of a computer system;
   initiating a boot process for the computer system;
   probing the computer system to identify one or more devices, including the boot device;
   assembling a representation of the identified one or more devices, wherein each identified device is represented by a node;
   converting said operating parameters into boot device properties;
   storing said boot device properties in a device information data structure; and
   after an operating system kernel for the computer system is loaded, configuring the boot device with said boot device properties.

2. The method of claim 1, wherein the operating parameters include one or more of a data rate and a duplex setting.

3. The method of claim 1, wherein the operating parameters include a link-clock setting.

4. The method of claim 1, wherein one or more of the operating parameters indicate that they are to be configured through auto-negotiation.

5. The method of claim 1, wherein said initiating comprises receiving a command to boot the computer system from a remote source.

6. The method of claim 1, wherein a first node representing the boot device provides access to the device information data structure.

7. The method of claim 1, further comprising:
   applying said boot device properties to establish a communication connection between the computer system and a boot source; and
   loading a secondary boot program from the boot source.

8. The method of claim 7, further comprising:
   executing the secondary boot program to locate a source of a tertiary boot program.

9. The method of claim 8, wherein the tertiary boot program comprises an operating system kernel.

10. The method of claim 1, further comprising:
    applying said boot device properties to establish a communication connection between the computer system and a root source; and
    loading from the root source an operating system kernel.

11. The method of claim 10, further comprising:
    executing the operating system kernel.

12. A computer readable storage medium storing instructions that, when executed by a computer, cause the computer to perform a method of persisting boot device operating parameters, the method comprising:
    receiving one or more operating parameters for a boot device of a computer system;
    initiating a boot process for the computer system;
    probing the computer system to identify one or more devices, including the boot device;
    assembling a representation of the identified one or more devices, wherein each identified device is represented by a node;
    converting said operating parameters into boot device properties;
    storing said boot device properties in a device information data structure; and
    after an operating system kernel for the computer system is loaded, configuring the boot device with said boot device properties.

13. A method of booting a computer system while using persistent boot device operating parameters, comprising:
    receiving a command to boot the computer system;
    receiving an operating parameter for a boot device with which the computer system is booted;
    probing the computer system to identify one or more devices, including the boot device;
    assembling a device tree, wherein each node of the device tree represents one of the identified one or more devices;
    converting the operating parameter into a boot device property;
    storing the boot device property in a persistent data structure comprising the device tree, wherein said storing comprises:
       at a device tree node representing the boot device, storing one or more properties, including said boot device property;
    establishing a first communication connection through the boot device;
    loading a boot program through the first communication connection;
    establishing a second communication connection through the boot device;
    loading an operating system kernel through the second communication connection; and
    executing the operating system kernel.

14. The method of claim 13, wherein said executing comprises:
    configuring the boot device with said boot device property.

15. The method of claim 13, wherein said establishing a first communication connection and said establishing a second communication connection each comprise:
    configuring the boot device with said boot device property.

16. The method of claim 13, wherein:
    the boot device is a network interface module; and
    the operating parameter is one of:
       a data rate;
       a duplex setting; and
       if said data rate is greater than 1000 megabits per second, a link-clock setting.

17. The method of claim 16, wherein said boot device property conforms to clause 22.2 of IEEE Standard 802.3ab.

18. The method of claim 13, further comprising:
    each time a communication connection is to be established during the booting of the computer system, retrieving said boot device property from the device tree node.

19. A computer readable storage medium storing instructions that, when executed by a computer, cause the computer to perform a method of booting a computer system while using persistent boot device operating parameters, the method comprising:
receiving a command to boot the computer system;
receiving an operating parameter for a boot device with which the computer system is booted;
probing the computer system to identify one or more devices, including the boot device;
assembling a device tree, wherein each node of the device tree represents one of the identified one or more devices;
converting the operating parameter into a boot device property;
storing the boot device property in a persistent data structure comprising the device tree, wherein said storing comprises:
at a device tree node representing the boot device, storing one or more properties, including said boot device property;
establishing a first communication connection through the boot device;
loading a boot program through the first communication connection;
establishing a second communication connection through the boot device;
loading an operating system kernel through the second communication connection; and
executing the operating system kernel.

20. A computer system for persisting boot device operating parameters during booting of the computer system, comprising:
a processor configured to execute an operating system kernel upon completion of booting the computer system;
a boot device with which the computer system can be booted, wherein the boot device comprises:
a first driver configured to convert a parameter of a boot command into a first boot device property; and
a persistent data structure comprising an assembled device tree having nodes corresponding to one or more identified devices of the computer system, including a first node corresponding to the boot device, wherein each node provides access to device-specific properties of the corresponding device;
wherein said first boot device property is stored in said persistent data structure and is used to establish one or more communication connections through the boot device during the booting of the computer system.

21. The computer system of claim 20, wherein the first boot device property comprises one or more of a data rate and a duplex setting.

22. The computer system of claim 20, wherein the first boot device property comprises a link-clock setting.

23. The computer system of claim 20, wherein the boot device is configured with the first boot device property to facilitate establishment of a communication connection to a boot source.

24. The computer system of claim 23, wherein a boot program is loaded into the computer system from the boot source.

25. The computer system of claim 20, wherein the boot device is configured with the first boot device property to facilitate establishment of a communication connection to a root source.

26. The computer system of claim 25, wherein the operating system kernel is loaded into the computer system from the root source.

27. The computer system of claim 26, wherein the computer system configures the boot device with the first boot device property after the operating system kernel is loaded.

28. A method of persisting boot device operating parameters during a boot process requiring multiple separate communication connections through the boot device, the method comprising:
receiving a set of parameters for operating a boot device of a computer system to facilitate booting of the computer system;
converting the parameters into device properties for operating the boot device;
storing said device properties in a persistent data structure;
using said device properties to establish a first communication connection between the boot device and a boot source;
loading a secondary boot program from the boot source;
terminating the first communication connection;
using said device properties to establish a second communication connection between the boot device and a root source; and
loading an operating system kernel from the root source;
wherein said device properties are not modified or replaced between said storing said device properties and said loading an operating system kernel.

29. The method of claim 28, further comprising, after said loading an operating system kernel:
initializing the boot device with said device properties; and
executing the operating system.

30. The method of claim 28, wherein said storing said device properties in a persistent data structure comprises:
assembling a device tree, wherein each node of the device tree corresponds to a device detected within the computer system; and
storing said device properties in a device-specific data structure accessible via a device tree node corresponding to the boot device.

* * * * *